United States Patent [19]

Dhar et al.

[11] 4,440,611

[45] Apr. 3, 1984

[54] CATHODIC ELECTROCHEMICAL PROCESS FOR PREVENTING OR RETARDING MICROBIAL AND CALCAREOUS FOULING

[75] Inventors: Hari P. Dhar; John O. Bockris; Donald H. Lewis, all of College Station, Tex.

[73] Assignee: The Texas A & M University System, College Station, Tex.

[21] Appl. No.: 328,853

[22] Filed: Dec. 9, 1981

[51] Int. Cl.$^3$ .............................................. C23F 13/00
[52] U.S. Cl. .................................... 204/147; 204/149; 204/196; 204/84
[58] Field of Search ............... 204/147, 148, 196, 197, 204/84, 149

[56] References Cited

U.S. PATENT DOCUMENTS

| | | | |
|---|---|---|---|
| 1,021,734 | 3/1912 | Delius et al. | 204/147 |
| 1,128,966 | 2/1915 | Fischer | 204/84 |
| 3,241,512 | 3/1966 | Green | 204/196 |
| 3,242,064 | 3/1966 | Byrne | 204/196 |
| 3,692,650 | 9/1972 | Kipps et al. | 204/196 |
| 3,766,032 | 10/1973 | Yeiser | 204/196 |
| 3,793,173 | 2/1974 | Kawahata et al. | 204/84 |
| 4,196,064 | 4/1980 | Harms et al. | 204/196 |
| 4,256,556 | 3/1981 | Bennett et al. | 204/147 |

FOREIGN PATENT DOCUMENTS 3388 of 1903 United Kingdom ................ 204/196

Primary Examiner—T. Tung
Attorney, Agent, or Firm—Arnold, White & Durkee

[57] ABSTRACT

This invention relates to a method for preventing or retarding microbial or calcareous fouling of a conducting or semi-conducting surface in an aqueous environment. This method produces an effective concentration of hydrogen peroxide at or near the surface to be protected by applying a sufficient cathodic voltage and a sufficient cathodic current to electrochemically generate an effective concentration of hydrogen peroxide. This effective concentration is preferably produced at very low current densities, i.e., at densities of less than about 100 microamperes per square centimeter. This effective concentration is further preferably produced at cathodic voltages less than that required to generate hydrogen gas at the cathode.

8 Claims, 6 Drawing Figures

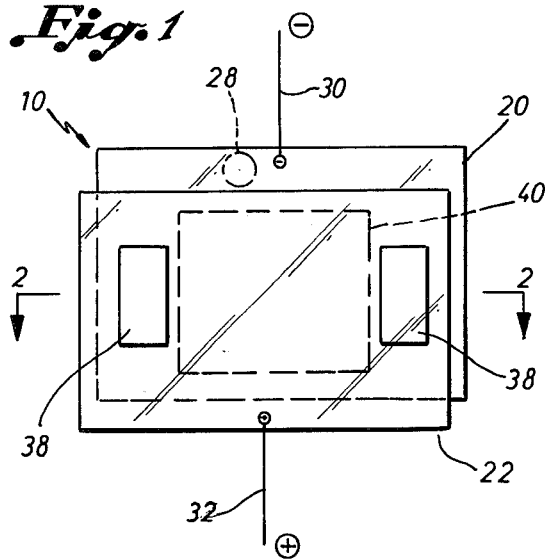
Fig. 1
Fig. 2
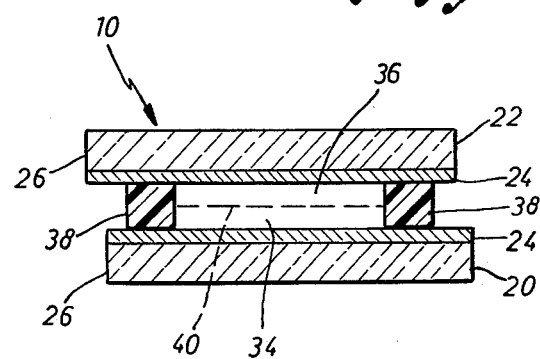
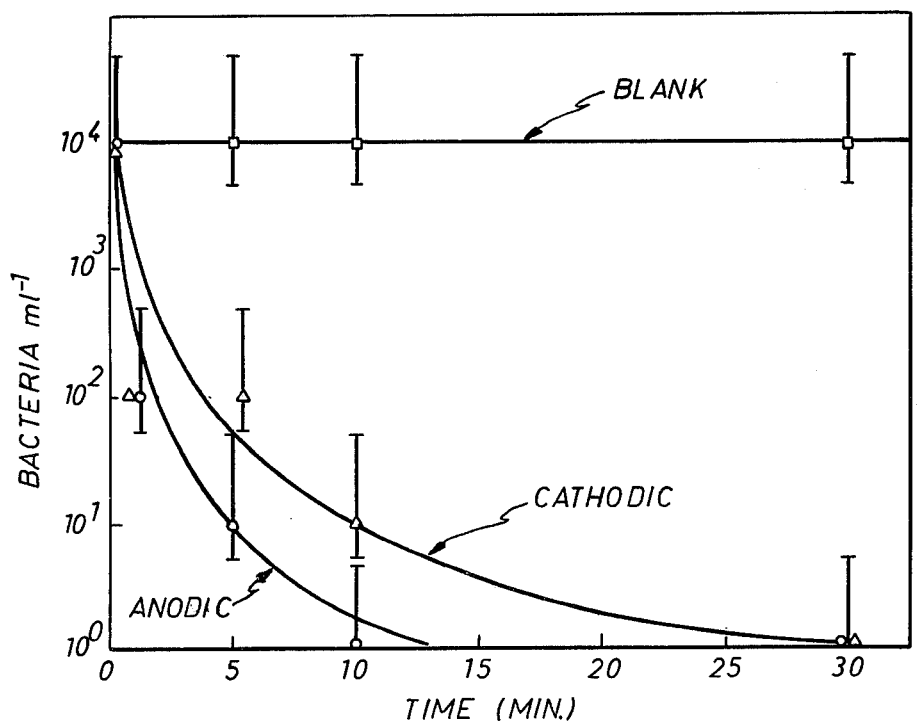
Fig. 3

CATHODIC ELECTROCHEMICAL PROCESS FOR PREVENTING OR RETARDING MICROBIAL AND CALCAREOUS FOULING

The Government of the United States of America has rights to this invention pursuant to Grant No. NA 79 AA-D-00127 awarded by the National Oceanic and Atmospheric Administration—Sea Grant College Program, Department of Commerce.

BACKGROUND OF THE INVENTION

1. Field of the Invention

This invention relates to a method for preventing or retarding the microbial or calcareous fouling of a conducting or semiconducting surface in an aqueous environment. More specifically, such a method comprises applying a cathodic voltge and current to a conducting or semiconducting surface to produce at or near the surface an effective concentration of hydrogen peroxide by the in situ reduction of dissolved oxygen.

2. Background

The formation of microbial or calcareous deposits on metallic surfaces in contact with natural waters is a well recognized and long standing problem of universal concern. The formation of such deposits sets the initial stage for more serious biofouling when the ambient water contains bacteria, algae, barnacles, mussels or other organisms. In heat exchange systems, this microbial and calcareous fouling is responsible for the loss of heat transfer capacity, the reduction of water flow and control through fouled lines and the increased corrosion of the heat exchange surfaces.

Previously both mechanical and chemical means have been used in attempts to prevent or retard such fouling. Mechanical cleaning requires that the fouled equipment be shut down and subjected to ultrasonic vibrations, and washed or mechanically scrapped, e.g. by inserting rubber balls or other mechanical devices. Such mechanical cleaning results in significant lost operating time for the equipment. Chemical treatment has used such toxic materials as chlorine and other chlorine based compounds, ozone, organosulfurs and other selected organic toxics. These toxic materials are generally added to the bulk water supply. Such bulk addition of large quantities of toxic materials may be both expensive and environmentally unacceptable by producing large quantities of toxic water.

In situ electrochemical techniques have been employed to generate toxic materials. Such techniques have included the anodic generation of chlorine from dissolved chloride ions in salt water environments. The cathodic evolution of hydrogen at relatively high current densities, e.g., 1-10 milliamperes per square centimeter, was partially successful in retarding microbial fouling but resulted in increased calcareous deposits because of the highly alkaline (approximate pH 11.5-13.0) condition created near the surface. The anodic electrochemical generation of oxygen and the production of an acidic condition near the anode surface has been suggested as a means of achieving biofouling and scale control. Current densities greater than 0.1 milliampere per square centimeter are required. A disadvantage of this process is that the anode must be constructed of or coated with a special corrosion resistant and electrocatalytic coating, such as titanium, certain noble metal alloys or certain mixtures containing at least one noble metal oxide.

Such prior methods of preventing or retarding biofouling and scale growth are inefficient, expensive and environmentally unacceptable. Mechanical scraping requires the fouled equipment to be out of operation for a significant time, resulting in heavy financial costs. Treatment of the bulk water requires excessive quantities of toxic chemicals and produces environmentally unacceptable quantities of water contaminated with these toxic chemicals or their residues.

The prior attempts to control such fouling by in situ electrochemical methods have required high current densities resulting in significant power costs and have not been completely successful.

SUMMARY OF THE INVENTION

The present invention provides a solution to the long felt but unfulfilled need for an economical and environmentally acceptable means of preventing or retarding the microbial or calcareous fouling of a conducting or semiconducting surface in an aqueous environment. Such fouling is prevented or retarded by producing an effective concentration of hydrogen peroxide at or near the surface to be protected by the application of a sufficient cathodic voltage and a sufficient cathodic current to electrochemically reduce dissolved oxygen in the electrolyte to produce hydrogen peroxide.

Such an effective concentration of hydrogen peroxide may be produced at extremely low current densities. Current densities less than about 100 microamperes per square centimeter are employed, although current densities as low as 10 or less microamperes per square centimeter are effective. Concentrations of hydrogen peroxide as low as about 0.5 micromoles per liter in the interphasial layer near the surface have been shown to be effective.

Further power savings may be enjoyed while producing effective concentrations of hydrogen peroxide by applying the required cathodic voltage and cathodic current intermittently, with the surface intermittently held electrochemically neutral. The cathodic potential sufficient to produce hydrogen peroxide is such that gaseous hydrogen will not be produced at the cathode. This, in combination with the slightly alkaline condition created during the production of hydrogen peroxide, decreases the danger of the precipitation of hydroxides or carbonates to form calcareous deposits on the surface.

DESCRIPTION OF THE DRAWINGS

FIG. 1 illustrates the top view of an experimental unit used to study the present method of preventing microbial and calcareous fouling.

FIG. 2 illustrates a horizontal cross-section through 2—2 of the experimental unit of FIG. 1.

FIG. 3 illustrates the bacterial concentration in the bulk solution of the cathode compartment (Δ), the anode compartment (o) and with no potential applied (□).

DETAILED DESCRIPTION OF THE INVENTION

Figure 4:
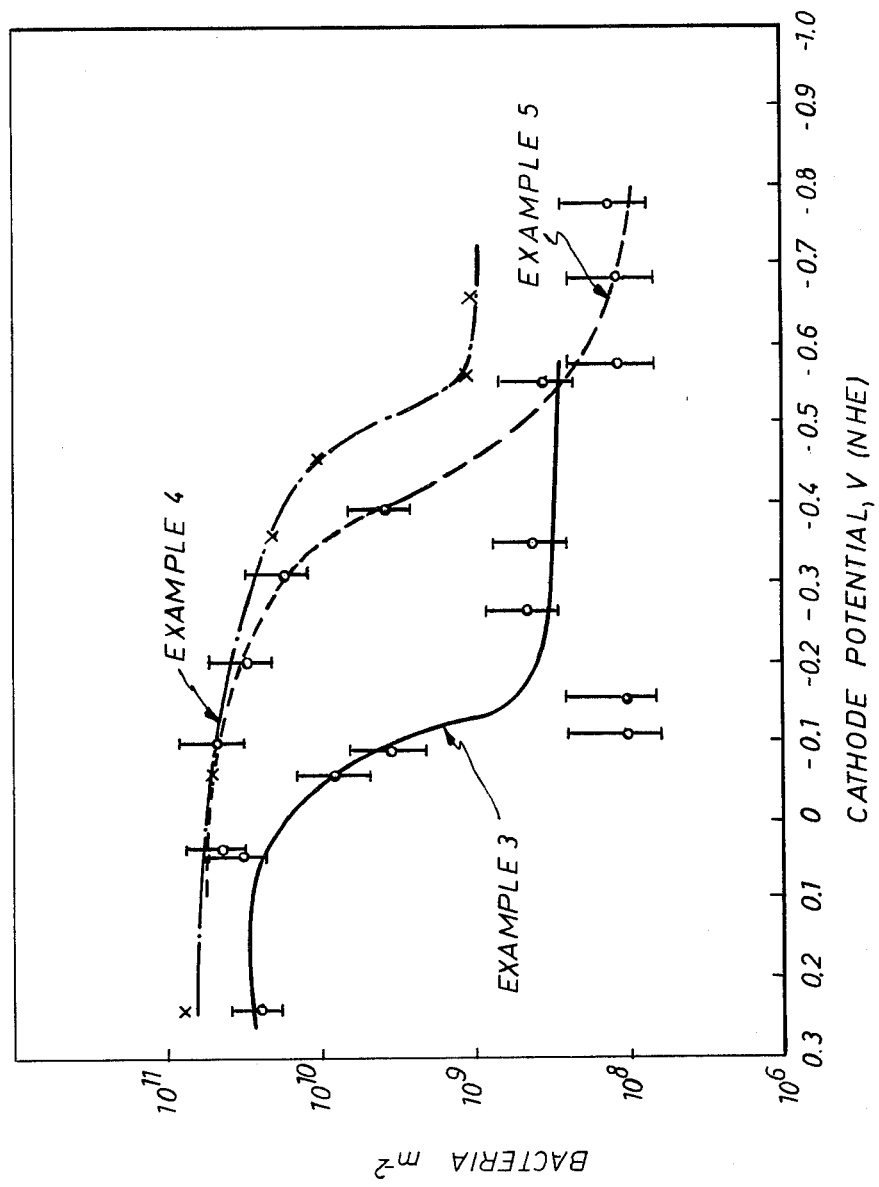
FIG. 4 illustrates bacterial adsorption at various steady electrode potentials.

The invention reduces the settlement of bacteria on cathodic conducting and semiconducting surfaces by a factor of 100 to 1000. The growth of such bacterial formations is reduced by 99–99.9%. Simultaneously, bacterial concentrations on the anode are also reduced by 99–99.99%. This reduction in bacterial concentrations on these surfaces is not accompanied by an increase in calcareous deposits.

The present invention may be employed in a wide variety of fields. It is currently believed that the most useful application of the present invention will be as a means to prevent or retard the microbial or calcareous fouling of heat exchangers, thus preventing interference with the heat transfer characteristics of the surfaces. This invention may find specific uses in boiler pipelines, heat exchange tubes, water distillation pipelines, desalination units, shipboard seawater heat exchangers or offshore installations for drilling and mining activities. Presently believed to be the most significant area for application of this invention is the proposed Ocean Thermal Energy Conversion (OTEC) power plants. The heat exchange surfaces in OTEC plants must be kept clean in order to efficiently convert the stored solar energy of the warm surface water to electricity. Use of conventional antifouling means in OTEC plants would produce environmentally unacceptable huge quantities of toxic water or require unacceptably high power consumption. It has even been suggested that this invention may find medical application as a means to prevent the formation of plaque on teeth.

The present invention is directed to a method of preventing or retarding microbial or calcareous fouling of a conducting or semiconducting surface in an aqueous environment. Because the power consumption and current density is very low, the aqueous environment need only be slightly conducting. Accordingly, not only may this method be employed in salt water environments, but it may also be employed in most fresh water aquatic systems.

In the method of the present invention a cathodic voltage sufficient to electrochemically produce hydrogen peroxide from dissolved oxygen in the aqueous environment is applied to the conducting or semiconducting surface. An appropriate voltage may be determined for any such conducting or semiconducting surface. The appropriate cathodic voltage is always maintained within a range where hydrogen peroxide is produced. A cathodic current sufficient to produce in the aqueous environment at or near the cathodic surface an effective concentration of hydrogen peroxide to prevent or retard microbial or calcareous fouling is applied. Such an effective concentration is produced at a cathodic current density of less than about 100 microamperes per square centimeter. In fact, such an effective concentration is generally produced at a cathodic current density of about 10 microamperes per square centimeter.

As those skilled in the art may appreciate, the effective concentration may vary depending on the particular microbes present and the concentrations of these microbes. Tests were conducted employing the bacteria *Vibrio anguillarum* to determine the concentration of hydrogen peroxide at which an effective decrease in bacterial action was observed. The results of these tests are summarized in Table 1.

TABLE 1

| Viability of *Vibrio anguillarum* at Various Hydrogen Peroxide Concentrations ||
|---|---|
| Hydrogen Peroxide Concentrations (moles per liter) | Bacterial Concentrations (bacteria per milliliter) |
| $10^{-8}$ | 1000 |
| $10^{-7}$ | 300 |
| $10^{-6}$ | 10 |
| $10^{-5}$ | 4 |
| $10^{-4}$ | 1 |
| $10^{-3}$ | 1 |

The bacterial concentration was reduced by a factor of 100 in the presence of hydrogen peroxide at a concentration of 1 micromole per liter and was reduced by a factor of 33 in the presence of hydrogen peroxide at a concentration of 0.5 micromoles per liter. At these levels, the electrode surface would be likely to be toxic to *Vibrio anguillarum*. Accordingly, effective control of microbial and calcareous fouling may be expected to be achieved using this method wherein the concentration of hydrogen peroxide produced at or near the surface is as low as about 0.5 micromoles per liter.

It has further been discovered that microbial or calcareous fouling may be effectively controlled employing the above method even when the cathodic voltage and cathodic current are applied to the surface intermittently. Although the "off" periods may be as short as one tenth or as long as ten times the "on" periods, the most efficient and effective results are apparently achieved when these periods are about equal.

The methods of the present invention may be employed at potentials insufficient to produce hydrogen gas at the cathode, thus having little effect on the aqueous pH at or near the electrode surface and thus not encouraging calcareous formations on the electrode.

In the present invention an electrochemical potential sufficient to generate hydrogen peroxide from the oxygen dissolved in the aqueous environment is applied to the metallic or semimetallic cathode surface. Hydrogen peroxide is generated cathodically on the surface of the electrode by reduction of the dissolved oxygen present in the electrolyte. Electrolytes used with this invention have been seawater, artificial seawater and 3% sodium chloride solution. However, because the current used in this invention is relatively small, on the order of a few microamperes, a highly conducting electrolyte is not required. In fact, the conductivity of fresh water is sufficient to apply this invention to fresh water aquatic systems.

The cathodic electrochemical reaction for the generation of hydrogen peroxide may be represented by:

$$O_2 + 2H^+ + 2e^- \rightarrow H_2O_2 \qquad (1)$$

or

$$O_2 + 2H_2O + 2e^- \rightarrow H_2O_2 + 2OH^-. \qquad (2)$$

The reaction represented by equation (1) proceeds in acidic media at $E_o = 0.68$ volts, while the reaction represented by equation (2) proceeds in alkaline media at $E_o = -0.146$ volts. Where the concentration of hydrogen peroxide is one micromole per liter and the partial pressure of oxygen is one-fifth atmosphere, the reversible electrochemical potential, $E_{rev}$, for the generation of hydrogen peroxide is 0.43 volts when measured against a normal hydrogen electrode (NHE) in an elctrolyte with a pH of 7. The range of working potential for the above reactions is 0.0 to −0.6 volts versus normal hydrogen electrode.

The reactions to produce hydrogen peroxide proceed at about 10% efficiency, with the competing reaction being the four electron reduction of oxygen to water or to hydroxyl ions. Further, in these potential regions, the evolution of hydroen gas does not occur. It appears that the optimum production of hydrogen peroxide occurs near −0.4 volts, although operation in the range from about −0.2 to about −0.6 volts is preferred. Thus, in practicing the invention of the present application, it is preferred that the electrode potential is always controlled within a range where hydrogen peroxide is produced. Those skilled in the art will appreciate that a potential for the generation of hydrogen peroxide may be established for different elctrodes and different environments.

Although it is presently believed that the hydrogen peroxide generated cathodically is responsible for the decreased microbial and calcareous fouling of the cathode, other mechanisms may contribute to the beneficial results achieved by this invention. The generation of hydrogen peroxide is accompanied by a slight increase in pH resultant from the reactions shown in equations (1) and (2). However, this slight increase, generally less than one pH unit, probably has little effect on microbial and calcareous fouling. The consumption of dissolved oxygen by the electrochemical reactions at the surface reduces the quantity of oxygen available for metabolic activities and impedes the adhesion of microorganisms to the electrode surface. The surface energy changes with potential. Because micro-organisms easily adhere to a surface with high energy, adhesion will be hindered as surface energy decreases. Finally, some bacteria may be electrocuted at certain potentials.

The limiting current density for hydrogen peroxide production without stirring of the electrolyte is about 5 microamperes per square centimeter. At a current efficiency of 10% the concentration of hydrogen peroxide produced in the volume within about 0.02 centimeters of the surface will be about 5 micromoles per liter. This concentration has been shown to be in the lethal range. See Table 1. In fact, concentrations as low as 0.1 micromole per liter will effect bacterial life in aqueous solutions. This shallow layer, the Prandtl layer, within about 0.01-0.02 centimeters of the electrode surface is relatively undisturbed by any flow in the bulk aqueous environment.

The power consumption may be reduced by interrupting the application of the cathodic potential and applying this potential in a periodic pattern. The surface to be protected may be subjected to a repetitive, cyclic potential such that the surface is cathodically polarized for short periods followed by a reversion to a potential where no electrochemical reaction occurs for alternate periods. Such a pulsing operation will reduce the total current drawn and is effective for certain bacterial and aqueous environments.

Having generally described the invention, a further understanding thereof may be obtained by reference to the following specific examples which are provided herein for purposes of illustration only and are not to be construed as limiting in any way.

The experimental unit used in the following examples is illustrated in FIGS. 1 and 2. FIG. 1 illustrates this unit from the top; FIG. 2 illustrates a horizontal cross-section of this unit. The experimental unit 10 comprises a cathode 20 and an anode 22. These electrodes comprise a conductive tin oxide coating 24 on a glass substrate 26. The cathode is connected to the negative side of a power source by lead 30, while the anode is connected to the positive side by lead 32. A reference electrode 28 is positioned in the cathode compartment 34. An ion exchange membrane 40 separates the cathode compartment 34 from the anode compartment 36. These compartments are each about 0.02 centimeters in thickness. Glass spacers 38 separate the cathode from the anode.

A marine bacterium, *Vibrio anguillarum*, was employed for the following studies. The bacteria were cultured batch wise in marine broth at 21° C. for 24 hours. A portion of the culture medium containing the bacteria was diluted appropriately in 3% sodium chloride solution before subjecting the bacteria to experimental studies. Because the age of a culture can be important in the studies of bacterial attachment, fresh culture was prepared to initiate each experiment.

The bacteria were suspended in 3% sodium chloride solution at a pH of 6.5. A Nafion No. 425 cation exchange membrane (DuPont) was used to separate the cathode and anode compartments. The membrane was kept emmersed in water for two to three days to allow leaching of any acidic organic groups prior to its use in the electrochemical cell.

Transparent and conducting materials which would facilitate observations of bacteria under a light microscope were employed as electrodes. Tin oxide glass (NESA TM) and indium oxide glass (NESATRON TM), both obtained from Pittsburgh Plate Glass Industries, were employed as electrodes. Surface resistivity of these glasses is about 80 ohms per square centimeter. No difference in results was observed between these glasses. Electrical connections to the conducting glasses were established with conducting silver epoxy over which a coating of epoxy resin was applied.

The tin oxide glass was cut into pieces having surface areas of five square centimeters. These electrodes were degreased in acetone, immersed in absolute ethanol for ten minutes and dried in an oven.

A potentiostat (ECO, Model 549) was employed to apply an appropriate potential in the range from about 0.2 to about −0.56 volts (NHE) to the working cathodic electrode. This range of electric potential is the range required for the production of hydrogen peroxide, i.e., the hydrogen peroxide producing potential. A reference electrode (saturated calomel) was employed in the working electrode compartment. In the pulsing experiments pulses were applied from a pulse generator (PAR, Model 175) through the potentiastat to the working electrode. The pulse length was generally varied from about 0.1 seconds to about 100 seconds while the pulse height was varied from about 0.24 to about −1.0 volts. The cathodic potential is alway maintained within the range of potentials where hydrogen peroxide is produced, whether pulsing or not.

Bacteria adsorbed on the electrode surface were fixed for two hours in 3% sodium chloride solution containing 4% glutaraldehyde by volume. The fixed electrode surfaces were then placed for ten minutes in successive saline solutions of degreasing salinity, followed by distilled water, an aqueous acetone solution containing 25-100% acetone and finally an acetone-xylene solution containing 50-100% xylene. Following air drying of these samples, they were coated with a gold/palladium mixture in a vacuum evaporator (Hammer I by Techniques, Inc.) and examined in a scanning electron microscope (Jananese Electron Optical Lamps, Model JSM-35) operated at 25 kV accelerating voltage.

An Olympus microscope (Model BHA) at magnification 400-800X equipped for phase constrast and dark-field illumination was used to observe bacterial movement in very thin electrochemical cells made of tin oxide glass.

EXAMPLE 1

Bacterial motility was examined during the application of an electrical potential to the transparent and semiconducting tin oxide coated glass electrodes in contact with solution. After introduction of *Vibrio anguillarum* at a concentration of $10^7$–$10^8$ bacteria per liter into the experimental unit 10 the bacteria were observed under a light microscope fitted with a dark-field illumination device. The bacteria ceased movement in about five minutes when a potential of $-0.3$ V (NHE) was applied through a potentiostat.

EXAMPLE 2

FIG. 3 was obtained by determining the bacterial concentration in the bulk solution at various times using the experimental unit of FIGS. 1 and 2. FIG. 3 shows that the bacterial population in the bulk solution decreases with time of electrical polarization both in the cathode and anode compartments for a period of one-half hour. The numbers of bacteria in the bulk solution were obtained by the serial dilution technique. The working electrode potential was $-0.3$ volts and that of the complete cell was 1.9 volts, leading to an anode potential of 1.6 volts. The steady-state current density at the end of the experiment was 5 microamperes per square centimeter. The diffusion of hydrogen peroxide to the bulk solution in the cathode chamber and of chlorine in the anode chamber are believed to be the reasons for the decrease in the bacterial concentration in the bulk solutions.

EXAMPLE 3

The effect of electrochemical potential on the concentration of adsorbed bacteria was examined in a beaker type cell (not shown) of 100 milliliter volume divided by a Nafion No. 425 membrane. Electrodes were tin oxide coated glass each with an area of about five square centimeters. Electrical connections to the tin oxide were established with silver epoxy over which a coating of epoxy resin was applied. A potential in the range of 0.2 to $-0.56$ volts was applied to the cathodic surface within one second of the immersion of the electrodes into the cell solution containing $10^7$ bacteria per milliliter. The experimental time at each potential was six hours. FIG. 4 shows the number of adsorbed bacteria versus applied potential. The concentration of bacteria on both the cathode and anode decreases. On the cathode, negative potentials are effective in reducing the number of bacteria on the surface. A reduction by a factor of 500 in the number of adsorbed bacteria was achieved in this example.

EXAMPLE 4

Example 3 was repeated except that titanium electrodes and artificial sea water were used. The results are also illustrated in FIG. 4.

EXAMPLE 5

Example 3 was repeated except that tin oxide coated glass electrodes and natural sea water were used. The results are also illustrated in FIG. 4.

EXAMPLE 6

In a variation of Examples 3 and 4, the beaker type cell was provided with inlets for slow inflow of nutrients (0.04% marine broth) in the cathode and anode chambers. Outlets for outflow were also provided. This electrochemical cell was devised so as not to allow accumulation of bactericides in the cathode and anode compartments. The flow rate was adjusted to approximately 25-30 milliliters per hour, so that every two hours the contents of each compartment was replenished. The cathode was a five square centimeter piece of titanium metal, and the anode was a ruthenium dioxide chlorine type DSA electrode. During a 24 hour period, a constant potential of $-0.6$ V (NHE) was maintained. The average current density during the 24 hour period was approximately fifty microamperes per square centimeter. The number of bacteria on the cathode was approximately $10^5$ per square centimeter, while there were $3\times10^7$ bacteria per square centimeter on a blank titanium sample placed in the cathode compartment.

EXAMPLE 7

Figure 5:
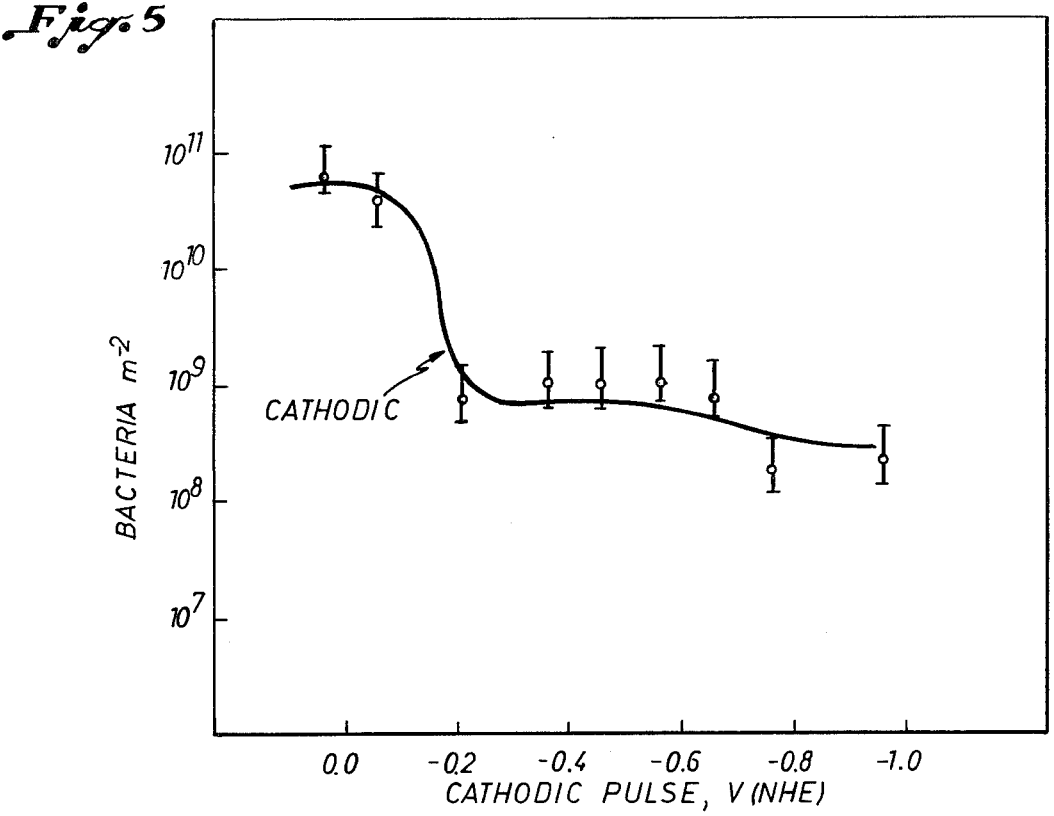
FIG. 5 illustrates bacterial adsorption versus pulse height potentials with pulse "on" for ten seconds, "off" for ten seconds.

Two tin oxide coated glass electrodes were immersed in 3% saline solution containing *Vibrio anguillarum* at a concentration of $10^7$ bacteria per milliliter in the divided cell of Example 3. Pulsing potentials with ten second periods of increasing cathodic pulse height separated by ten second "off" periods during which time the working electrode stayed at 0.24 volts were applied. The experimental time at each potential was six hours. FIG. 5 shows that adsorbed bacterial concentration decreased with pulse height in a similar way as in FIG. 4 which was obtained under the steady potential conditions.

EXAMPLE 8

Figure 6:
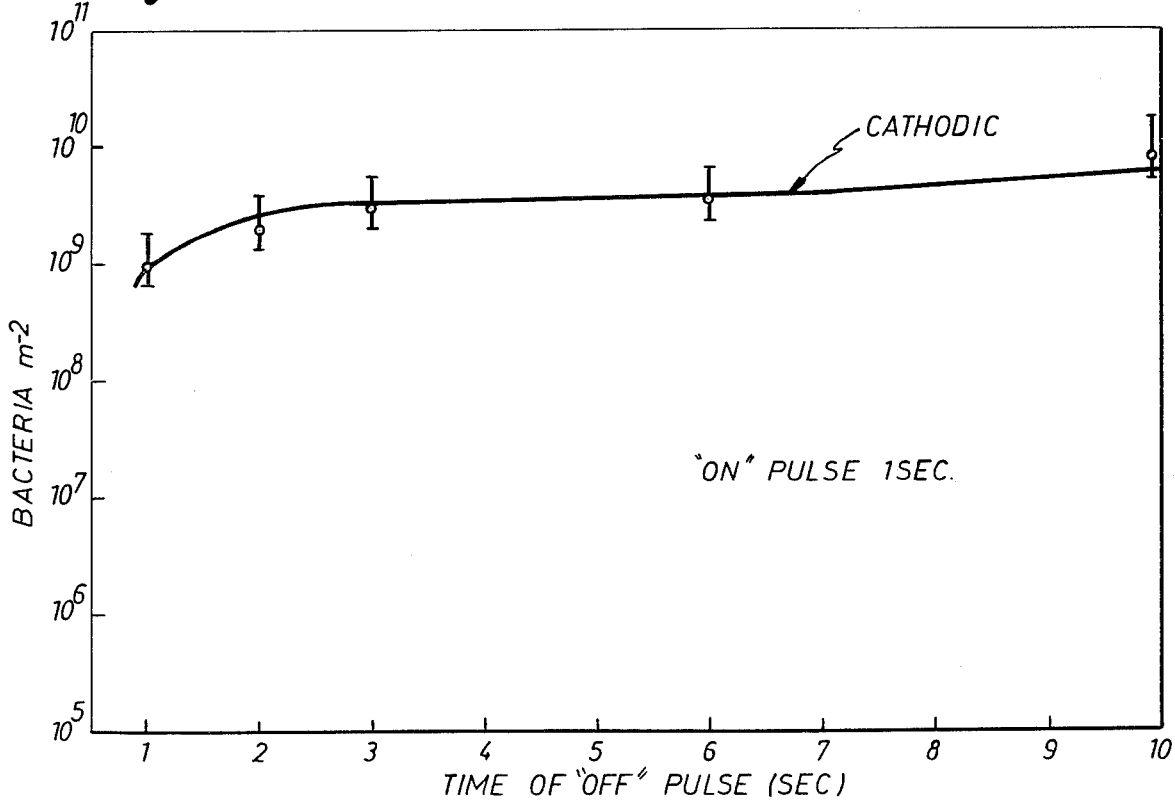
FIG. 6 illustrates bacterial adsorption versus times of the "off" pulse, with an "on" pulse of one second duration.

FIG. 6 illustrates the results of an experiment using tin oxide coated glass electrodes and 3% saline solutions when a pulsing potential of height $-0.36$ volts and duration one second followed by various "off" periods up to ten times the "on" period was applied. The cell was the divided beaker type cell used in Example 3. Even an "on" period of one second followed by a lengthy "off" period is effective in reducing the bacterial population.

EXAMPLE 9

Several tests with *Pseudomona atlantica and mixtures of Pseudomana atlantica* and *Vibrio anguillarum* in artificial sea water were carried out in steady state and pulsing potential conditions using tin oxide electrodes. Results were similar to those described in the previous examples.

While the above is illustrative of what is now contemplated to be the best mode of carrying out the present invention, the method of preventing or retarding microbial or calcareous fouling of a conducting or semiconducting surface in a aqeous environment is subject to modification without departing from the spirit and scope of the invention. For example, the conducting or semiconducting surface may be produced from many materials, for which those skilled in the art may easily determine a cathodic voltage at which hydrogen peroxide will be produced. Therefore, the invention is not restricted to the particular method illustrated and described, but covers all modifications which may fall within the scope of the following claims. It is applicant's intention in the following claims to cover such modifications and variations as fall within the true spirit and scope of the invention.

We claim:

1. A method of preventing or retarding microbial or calcareous fouling of a conducting or semi-conducting surface in an aqeuous environment, comprising:

applying a cathodic voltage and a cathodic current to said surface for the electrochemical production of hydrogen peroxide from oxygen dissolved in said aqueous environment;

limiting the maximum voltage and the maximum current applied to said surface to produce substantially no hydrogen by the electrolysis of said aqueous environment; and controlling said cathodic voltage within a range of potentials for continuously producing hydrogen peroxide on said surface, 2. A method of preventing or retarding microbial or calcareous fouling of a conducting or semi-conducting surface in an aqeuous environment, comprising:

applying a cathodic voltage and a cathodic current intermittently to said surface sufficient to produce, electrochemically, hydrogen peroxide at or near said surface; and controlling said cathodic voltage within a range of potentials for continuously producing hydrogen peroxide at or near said surface without producing significant amounts of hydrogen gas at said surface.

3. A method of preventing or retarding microbial or calcareous fouling of a conducting or semi-conducting surface in an aqeuous environment, comprising:

(a) applying a cathodic voltage and a cathodic current to said surface, wherein the applied current density on said surface is less than about 10 microamperes per square centimeter and the cathodic voltage is insufficient to produce hydrogen at said surface;

(b) producing, electrochemically, hydrogen peroxide at or near said surface from hydrogen dissolved in said aqueous environment, wherein the concentration of hydrogen peroxide is within the range of about 0.1 to about 5 micromoles per liter;

(c) controlling said cathodic voltage within a range of about $-0.6$ to about $-0.2$ volts for continuously producing hydrogen peroxide at or near said surface;

(d) limiting the magnitude of said cathodic voltage applied to produce substantially no hydrogen by the electrolysis of said aqueous environment;

(e) terminating said voltage and current; and (f) repeating steps (a) through (e) until sufficient retardation of microbial or calcareous fouling is effective.

4. A method of preventing or retarding microbial or calcareous fouling of a conducting or semi-conducting surface in an aqueous environment, comprising:

(a) applying a cathodic voltage and a cathodic current to said surface;

(b) producing electrochemically hydrogen peroxide at or near said surface from oxygen dissolved in said aqueous environment;

(c) controlling said cathodic voltage within a range of potentials for continuously producing hydrogen peroxide at or near said surface;

(d) limiting the magnitude of the cathodic voltage for producing substantially no hydrogen by the electrolysis of said aqueous environment;

(e) terminating said voltage and current; and (f) repeating steps (a) through (e) until sufficient retardation of microbial or calcareous fouling is effective.

5. The method of claims 1, 2 or 4 wherein the concentration of hydrogen peroxide produced at or near said surface is about 0.1 micromoles per liter.

6. The method of claims 1, 2 or 4 wherein the cathodic voltage is within the range of about $-0.6$ to about $-0.2$ volts for continuously producing hydrogen peroxide at or near said surface without producing significant hydrogen at or near said surface.

7. The method of claim 1 further comprising applying said cathodic voltage and said cathodic current intermittently to said surface.

8. The method of claims 2, 3, 4 or 7 wherein the intervals at which said voltage and said current are applied are about equal in time duration to the intervals at which said voltage and said current are not applied.

* * * * *